United States Patent Office 3,554,684
Patented Jan. 12, 1971

---

3,554,684
ARTICLES CONTAINING NON-CONJUGATED ALKENYLGUANAMINE POLYMERS
William D. Emmons, Huntingdon Valley, and John G. Brodnyan, Langhorne, Pa., assignors to Rohm and Haas Company, Philadelphia, Pa., a corporation of Delaware
No Drawing. Continuation-in-part of application Ser. No. 455,613, May 13, 1965. This application Feb. 26, 1969, Ser. No. 802,651
The portion of the term of the patent subsequent to May 27, 1986, has been disclaimed and dedicated to the Public
Int. Cl. D06m 13/34, 13/40
U.S. Cl. 8—116.2                     21 Claims

ABSTRACT OF THE DISCLOSURE

The present invention is concerned with articles containing addition polymers comprising 2-(ω-alkenyl)-guanamines in which the double bond of the alkenyl group is in non-conjugated relationship with respect to the unsaturation of the triazine ring and is part of a terminal group $H_2C=C<$.

---

This application is a continuation-in-part of application Ser. No. 455,613, filed May 13, 1965, now patent No. 3,446,777.

U.S. Pats. 2,461,943, 2,689,238 and 2,726,229 disclose alkenylguanamines in which the double bond of the alkenyl group is in a terminal $H_2C=C<$ group and is in conjugated relationship to the double bonds of the triazine ring. Such compounds are sensitive to strong bases and are unstable in the presence of such bases. In addition, these known compounds cannot be copolymerized with monoethylenically unsaturated monomers containing amino groups, such as aminoalkyl vinyl ethers, aminoalkyl vinyl sulfides, aminoalkyl acrylates and methacrylates, and N-(aminoalkyl)-acrylamides and -methacrylamides and the analogous monomers containing hydroxyl in place of the amino groups under alkaline conditions because of the fact that the latter amine or hydroxyl compounds add to the double bond of the alkayl group of the alkenylguaramine by the Michael addition reaction.

Even with such common monomers as ethyl acrylate, copolymerization of acryloguanamine is quite limited. For example, attempts to form copolymers by conventional emulsion technique from mixtures of acryloguanamine and ethyl acrylate containing more than one mole percent of the acryloguanamine fail by virtue of coagulation of the initial charge of the monomer mixture during polymerization.

The monomeric compounds of the present invention are not only more stable, especially with respect to basic materials, but also do not undergo the Michael reaction with monomeric alcohols and amines; in addition, mixtures, such as of ethyl acrylate, containing more than one mole percent of one of the guanamines of the present invention can be emulsion-copolymerized without coagulation difficulties. Hence, the compounds of the present invention are capable of producing a wider variety of copolymers with greater versatility in terms of chemical and physical properties.

The monomeric compounds of the invention include those of the formula:

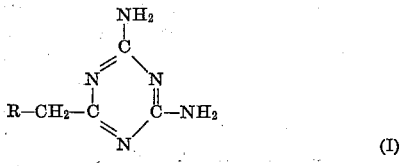

(I)

wherein R is an alkenyl group having 3 to 9 carbon atoms and a terminal group $H_2C=C<$. In other terms, the group R is an alkenyl group of the formula $-C_nH_{2n-1}$ in which $n$ has a value of 3 to 9, which alkenyl group has a terminal group $H_2C=C<$.

It has been discovered that these new monomeric compounds can be made in remarkably efficient manner and in most instances from relatively common, inexpensive starting materials. In general, the process is based on the reaction of a nitrile of an alkenoic acid of the Formula II with dicyandiamide (III) according to the following Equation A.

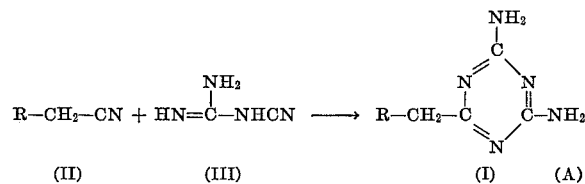

in which R is as defined hereinbefore.

This reaction is catalyzed by bases, such as an alkali metal hydroxide or a quaternary ammonium base, such as choline hydroxide or tetramethylammonium hydroxide. The reaction is favored by heating and the temperature used, to be practical, may be from about 40° C. to 200° C., preferably at about the reflux temperature of the system. The time of reaction may be from about an hour to 24 hours depending on size of batch, the particular reactants, temperature, and so on. Excess of one of the reactants, and especially of the nitrile (II), may serve as the reaction medium or solvent in the system. Optionally, other solvents, inert to the reactants and the basic catalyst, may be used, such as alcohols and ethers, examples of which include, ethanol, methanol (with pressure if higher temperatures are desired), isopropanol, tertiary butanol, octanol, dodecanol, ethyl ether, methyl propyl ether, dioxane, the methyl and ethyl ethers of ethylene glycol, diethylene glycol. As solvents there may also be used mixtures of these alcohols or the ethers or of both or mixtures thereof withhydrocarbons such as solvent naphthas, xylene, and toluene.

Besides the compounds of Formula I containing two unsubstituted $NH_2$ groups, the present invention embraces the methylolation products obtainable therefrom by reaction at a pH of 1 to 11, preferably 6 to 9, with formaldehyde or any source thereof, such as para-formaldehyde, trioxymethylene and paraldehyde. The methylolation may introduce from one to four methylol groups on one or both of these amine groups of the compounds of Formula I. Since some of the molecules in such a methylolation product may have a different degree of substitution of the methylol group than others, the extent of substitution may in most instances be referred to as an "average" of about 1 to 4. Related "alkylolation" products obtained by similar reaction of a compound (I) with other aldehydes, such as acetaldehyde, butyraldehyde, and benzaldehyde, are also included, but the methylolated products are preferred.

The present invention also embraces the N-alkoxymethyl products obtained by partial to complete alkylation of the N-methylol groups of the just-described methylolation products obtained by reaction of the aldehyde, especially formaldehyde, with the compound of Formula I in an acidic medium containing a saturated alcohol having from 1 to 8 carbon atoms, preferably 1 to 4 carbon atoms. Alternatively,the alkylolation product, especially the methylolation product, is reacted in a medium having a pH of 1 to 6.5 with a $(C_1-C_8)$-alcohol.

The methylolation (or methylolation and alkylation) of any of the compounds of Formula I can be carried out essentially in the same way as methylolation (or methylolation and alkylation) of melamine has been effected heretofore. U.S. Pat. 2,197,357 discloses typical procedures that can be used. That disclosure is incorporated herein by reference but it is to be understood that any other heretofore known procedure may be used to effect the methyloation or the methylolation and alkylation of the compounds of Formula I or their polymers.

The following Formula IV is a general formula for the most important compounds of the present invention:

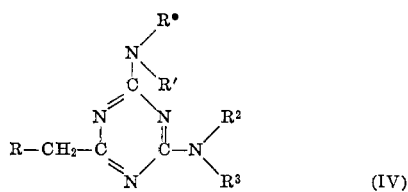

wherein R is as defined hereinabove,

R° is selected from the group consisting of H, CH$_2$OH, and CH$_2$OR″, wherein R″ is the hydrocarbon residue of a saturated alcohol R″OH having 1 to 8 carbon atoms, R′ is selected from the group consisting of H, CH$_2$OH, and CH$_2$OR″, R$^2$ is selected from the group consisting of H, CH$_2$OH, and CH$_2$OR″, and R$^3$ is selected from the group consisting of H, CH$_2$OH, and CH$_2$OR″.

The monomers of Formula IV are readily polymerizable and copolymerizable with each other and with other ethylenically unsaturated monomers having a terminal group of the formula H$_2$C=C< to form valuable polymeric substances having a molecular weight between about 1,000 and 1,000,000 useful for coating, impregnating, adhesive, and molding purposes.

Polymers containing polymerized units of the N-methylol and the N-alkoxymethyl derivatives of Formula IV may be obtained by reaction of a polymer of a monomer of Formula I with a source of formaldehyde and simultaneous, concurrent, or subsequent reaction with an alcohol.

The pH and temperature conditions used are the same as in the preparation of the N-methylol and N-alkoxymethyl monomers.

The ratio of the aldehydic reactant to the polymer (homopolymer or copolymer) may be varied as desired or as conditions may require, the proportions depending upon such influencing factors as, for instance, the particular polymer of the unsaturated guanamine and the particular aldehydic reactant employed and the particular properties desired in the finished product. If the aldehydic reactant is an aldehyde, e.g., formaldehyde, it is used in an amount sufficient to react with at least one of the reactive amino groups in the polymer, more particularly from one to all of the aforesaid reactive amino groups. Ordinarily the aldehydic reactant is employed in an amount such that at least 1% of the hydrogen atoms attached to the amino nitrogen atom of the guanamine polymer are replaced either by alkylol (specifically methylol) groups or by dehydration products thereof. There may be used, for example, from 0.5 to 8 moles of the aldehyde for each aldehyde-reactable recurring guanamine unit in the polymer.

The reaction between the aldehydic reactant and the polymer of the unsaturated guanamine can be effected under a wide range of pH conditions as has been indicated hereinbefore, for example, a pH of from about 1 or 2 to about 11, and more specifically a pH of from about 6 to about 9.

Any suitable temperature can be employed for effecting reaction between the polymer of the unsaturated guanamine and the aldehydic reactant. In some cases the reaction can be initiated at room temperature (20°–30° C.). Ordinarily, the temperature of the reaction varies between about 60° C. and the reflux temperature of the reaction mass when the reaction is carried out at atmospheric pressure in the presence of a solvent or diluent, or at or approaching the fusion point if the reaction mixture is a solid at normal room temperature. If the reaction is carried out at pressures above atmospheric, temperatures as high as, for example, 200°–225° C. or even higher may be employed.

The polymer of the unsaturated guanamine which is used as a starting reactant can be a homopolymer, or it can be a copolymer of the unsaturated guanamine with any other unsaturated material that is copolymerizable therewith and in any proportions. This polymer of the unsaturated guanamine may be obtained by copolymerization with any other unsaturated material that is copolymerizable therewith and in any proportions. This polymer of the unsaturated guanamine can be of any desired molecular weight, for example, an average molecular weight ranging between about 1,000 and about 1,000,000 as determined by viscosity measurements using the Staudinger equation.

The compounds of Formula IV may be copolymerized with any copolymerizable ethylenically unsaturated monomer. For example, any of the comonomers mentioned in the passage of column 3, line 25, to column 5, line 3, of Padbury et al. U.S. Pat. 2,726,229 may be used and all these comonomers are incorporated herein by reference.

To amplify, the unsaturated guanamine of the invention may be copolymerized with substantially any vinyl monomer. The term "vinyl monomer" as used herein means a polymer prepared from monomers comprising at least one of the following unsaturated groups:

vinylidene, CH$_2$=C<
vinyl, CH$_2$=CH— and
vinylene, —CH=CH— whether homopolymerizable or not. Examples are the α,β-ethylenically unsaturated monocarboxylic acids and esters and amides thereof, α,β-ethylenically unsaturated aldehydes, α,β-ethylenically unsaturated dicarboxylic acids and esters, amides, half esters, and half amides thereof, α,β-ethylenically unsaturated nitriles, hydrocarbons such as α-olefins, conjugated diolefins, vinylaryl compounds, vinyl alkyl ethers, vinyl halides, vinylidene halides, vinyl sulfides, vinyl acyloxy compounds (esters of saturated carboxylic acids and ethylenically unsaturated alkanols), vinyl amines and salts thereof, vinyl ureido monomers, vinyl compounds having heterocyclic nitrogen-containing (HN<) groups, and halogen, hydroxyalkyl, or aminoalkyl substituted derivatives thereof. The methods for the preparation of the aqueous dispersions of vinyl polymers are conventional and form no part of the present invention, and any known method may be used in accordance with the present invention. For examples of well known methods of preparing vinyl polymers, see "Polymer Processes," Schildknecht, Interscience, N.Y. (1956), pp. 111–174. Mixtures of different polymer dispersions are useful, as are aqueous dispersions prepared by first polymerizing in solution in an organic solvent, then dispersing the material in an aqueous medium. Of course the polymers may be prepared by mass or solution polymerization or by other methods.

Specific examples of suitable monomers which may be copolymerized with the alkenyl guanamines for use according to the invention are acrylic acid, methacrylic acid, itaconic acid, maleic acid, phthalic acid, esters and half esters thereof with alkanols having 1 to 20 carbon atoms, such as methanol, ethanol, butanol, pentadecanol and the like, and amides and half amides thereof with ammonia or organic amines, acrolein, methacrolein, ethylene, propylene, isobutene, butadiene, isoprene, chloroprene, styrene, vinyltoluene, vinyl methyl ether, vinyl isobutyl ether, vinyl chloride, vinyl bromide, vinylidene, chloride, vinyl sulfide, vinyl acetate, vinyl propionate, the vinyl pyridines, primary amino compounds such as $\beta$-aminoethyl vinyl ether, aminopentyl vinyl ether, secondary amino-containing compounds such as secondary amyl t-butyl aminoethyl methacrylate, tertiary amino-containing compounds such as t-dimethylaminoethyl methacrylate, and the allied amine salts such as the chloride or hydroxide, ureido monomers such as are disclosed in U.S. Pat. Nos. 2,881,155 to Hankins, 3,300,429 to Glavis and Keighly, and 3,356,627 to Scott, examples being $\beta$-ureidoethyl acrylate, $\beta$-(N,N'-ethyleneureido) ethyl acid maleate, $\beta$-ureidoethyl vinyl ether, N-vinyl-N,N'-ethyleneurea, N-vinyloxyethyl-N,N'-ethyleneurea, N-methacrylamidomethyl-N,N'-ethyleneurea, and N-dimethylaminoethyl-N'-vinyl-N,N'-ethyleneurea, $\beta$-hydroxyethyl methacrylate, N-hydroxyethylacrylamide, N-methylolacrylamide, and N-(dimethylaminoethyl)acrylamide. Homopolymers, copolymers, and graft, block, or segmented polymers are included. Conventional methods of obtaining the aqueous dispersions are utilized.

In addition, as explained hereinabove, comonomers which under alkaline conditions add on to the double bond of the alkenyl group of the conjugated systems of this patent by the Michael addition reaction can be successfully copolymerized with the compounds of Formula IV even under alkaline conditions. Examples of such comonomers which could not be copolymerized under alkaline conditions with the unsaturated guanamines of the patent art noted above are the amines and alcohols mentioned hereinbefore, namely, the aminoalkyl vinyl ethers and sulfides, aminoalkyl acrylates and methacrylates, N-aminoalkyl-acrylamides or -methacrylamides, hydroxyalkyl vinyl ethers or sulfides, and hydroxyalkyl acrylates and methacrylates. Specific monomers of this type include $\beta$-aminoethyl vinyl ether and sulfide, $\beta$-aminoethyl acrylate and methacrylate, N-$\beta$-aminoethyl-acrylamide and -methacrylamide, and $\beta$-hydroxypropyl acrylate and methacrylate.

Preferred comonomers for making copolymers of the present invention include acrylic acid, methacrylic acid, the nitriles thereof, the esters thereof with a saturated aliphatic alcohol having 1 to 18 carbon atoms, acrylamide, methacrylamide, the N-methylol derivatives of these amides, itaconic acid, vinyl acetate, vinyl chloride, vinylidene chloride, and vinylaromatic hydrocarbons, especially styrene, and o-, m-, and p-vinyltoluene.

The copolymers may contain from about $\frac{1}{2}\%$ to about 99–$\frac{1}{2}\%$ by weight of at least one compound of Formula IV with the balance of at least one other copolymerizable ethylenically unsaturated comonomer. Generally, preferred copolymers are of linear type in which the monomers from they are made consist essentially of monoethylenically unsaturated monomers having a terminal group, $H_2C=C<$. However, for some purposes, polyethylenically unsaturated comonomers may be used in amounts from about 0.1% to 20% or more by weight, based on the entire weight of monomers. Small amounts, such as 0.1 to 0.8% or 1% of such comonomers serve to increase the molecular weight without extensive cross-linking and gelation. Larger amounts serve to cross-link the copolymers to render them insoluble, and may be used to form granular ion-exchange resins by suspension polymerization techniques. Examples of polyethylenically unsaturated monomers include divinyl benzene, ethylene glycol dimethacrylate, and dialkyl phthalate.

The compounds of Formula IV may be polymerized or copolymerized in bulk, in solution, or in either an emulsion or suspension technique to produce various types of polymers including the granular type, as well as by the techniques resulting in nonaqueous dispersions of the polymer. Solution polymerization may be effected in such solvents as water, dimethylformamide or other of the solvents mentioned above in which the compounds of Formula IV and any comonomers that may be used are suitably soluble. Although some of the compounds of Formula IV have generally an appreciable solubility in water, all of the compounds of Formula IV may be copolymerized with water-insoluble monomers by an emulsion technique in which the comonomers and any excess of the compound of Formula IV over the amount that is soluble in the water are emulsified by non-ionic, cationic, or anionic emulsifiers or suitable mixtures thereof.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, and butyl hydroperoxide. Examples of azo catalysts include azodiisobutyronitrile, azodiisobutyramide, dimethyl or diethyl or dibutyl azodiisobutyrate, azobis($\alpha,\gamma$-dimethylvaleronitrile), azobis($\alpha$-methylbutyronitrile), azobis($\alpha$-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxide catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution, depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble, after which the suspension or slurry may be filtered or decanted and the polymer washed. Alternatively, the solvent may be distilled to leave the polymer. The nonaqueous dispersion or the solution of the polymer, of course, can be used as such.

In the case of emulsion polymerization, examples of suitable non-ionic emulsifiers include the higher alkyl phenoxy-polyethoxyethanols in which the alkyl group has from 6 to 18 carbon atoms, such as octyl, dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)-trimethylammonium chloride, and so on.

The monomers, and especially those containing N-methylol and/or N-alkoxymethyl groups, are useful as intermediates for modifying other materials containing a complementally reactive group. For example, they react with hydroxyl-containing materials, such as cellulose, starch, and cellulose esters and ethers which have not been completely esterified or etherified, and with amide-containing materials, such as polyamide nylons, wool, silk, casein, or other proteinaceous materials. Reaction with these materials may be resorted to for various purposes; e.g., to stiffen the materials; to crease-proof or render wrinkle-resistant such materials, especially cotton, rayon, and nylon; to reduce shrinkage and to stabilize against shrinkage such materials as wool, cotton, and rayon; to render any of such materials water-resistant and/or water-repellent, and/or to lubricate them, especially by applying the more hydrophobic compositions. As compared to acrylamide, methacrylamide, the conjugated alkenylguanamines of the patents supra, and their N-methylolated and N-alkoxymethylated derivatives, the monomers of the present invention do not undergo the Michael addition reactions with water, alcohols, amines and the like under alkaline conditions. They are less toxic and more stable thermally; they usually need no polymerization inhibitor under normal storage conditions; and they involve fewer and/or less difficult problems in manufacturing and handling, and their manufacture is less costly than the analogous conjugated alkenyl-guanamines mentioned heretofore.

Illustrative of this general type of use, cellulose material, in the form of fibers, filaments, woven or knitted fabrics or carded webs, or other fabricated structures, is impregnated with a solution containing 5% to 25% of a monomer of the present invention, especially one containing N-methylol or N-methoxymethyl groups, and then the treated fabric is subjected to conditions under which the monomer is polymerized by vinyl addition (that is, at the double bond) and also reacted with hydroxyl groups in the cellulose molecule. This may be accomplished by including within the impregnating solution used to apply the monomer, or by applying to the fabric before or after such impregnation, a free-radical initiator for the addition polymerization of the monomer which is of acidic character such as ammonium persulfate or, if not acidic, the initiator (such as tert-butyl hydroperoxide) is accompanied by an acid such as any of those mentioned hereinbefore. In this manner, the guanamine monomer penetrates the cellulose material and polymerizes to provide a long-chain molecule which at numerous positions becomes atached to the cellulosic molecules by means of ether linkages resulting from the reaction of the methylol groups in the polymer with the hydroxyl groups of the cellulose. Alternatively, the monomer may be polymerized by vinyl addition, using a free-radical initiator before or after reaction is effected with the cellulose through the methylol groups. However, the simultaneous or one-step operation is preferred and is generally more efficient for a given amount of monomer. By this procedure cellulose materials can have their resistance to creasing so greatly enhanced that crease-recovery angles as high as 145° or more are readily obtained. In addition, the loss in tensile strength as the result of chlorination followed by drying and ironing is markedly reduced as compared to that obtained if the monomer were merely reacted with the cellulose molecule by means of an alkaline catalyst.

To accomplish crease-proofing, 1% to 25% by weight, based on cellulose, of an N-methylol or N-alkoxymethyl-containing monomer of the present invention may be added directly to a cellulose, and the spinning is carried out in the same way as is disclosed in U.S. Pat. 3,093,446 and the disclosure thereof is incorporated herein by reference.

Copolymers containing from about ¼ to 30% by weight of the compounds of Formula IV are particularly valuable in the production of coating materials either in the form of emulsion polymers, particularly as aqueous dispersions, nonaqueous dispersions, or solution polymers, the latter being used as lacquers or enamels. The aqueous emulsion dispersions of such copolymers are adapted to be used as water-base paints or to be included in alkaline spinning solutions, such as cuprammonium cellulose or viscose solutions, to modify the dyeing characteristics and the moisture-retention characteristics. Copolymers containing about ½ to 30% of a compound of Formula IV with methyl methacrylate or other acrylic acid or methacrylic acid esters or mixtures thereof can be produced in organic solvent solutions such as in xylene and butoxyethel acetate or mixtures thereof and used as lacquers which are characterized by outstanding adhesion toward a wide variety of substrates, including bare and primed metals, such as bare cold-rolled steel, aluminum, and brass, and other substrates, such as glass, asbestos-cement shingles, wood, leather, paper, and textiles. Nonaqueous dispersions are used in a similar manner.

Copolymers containing about 1 to 30% by weight of a compound of Formula IV containing N-methylol and/or N-alkoxymethyl groups wth ethyl acrylate, butyl acrylate, or the like, are useful as binders for non-woven fabrics and to reduce the shrinkage of wool. For these purposes, they may be applied in aqueous dispersions of a concentration from 10% to 30% or more so that from about 5% to 15% or even up to 150% by weight of the copolymer is deposited on the fabric. After drying, the treated fabric may be heated to 220° F. to 350° F. for a period of one-half to fifteen minutes. Similar aqueous dispersions made by the emulsion copolymerization of a monomer of Formula IV with acrylic esters and especially butyl acrylate or ethyl acrylate are useful, with or without pigment, for the primary coating of leather.

The copolymers may be applied as hot-melt coatings. They may be applied as solutions in such organic solvents as toluene, xylenes, n-butanol, dimethylformamide, or mixtures thereof. If desired, the copolymers may be initially prepared in the solvent by which they are intended to be applied in coating, impregnation, and the like. The copolymers are also useful coatings when blended with alkyds and baked under acidic catalysis at 300° F. In more specific detail, solution copolymers containing 20 to 30% by weight of alkoxymethylated 4-pentenoguanamine can be blended with non-drying alkyds, including polyesters of saturated aliphatic polyols having 2 to 6 carbon atoms and 2 to 4 hydroxyl groups obtained from aliphatic or aromatic dicarboxylic acids having 6 to 12 carbon atoms, and such polyesters modified by non-drying oils, the weight ratio proportions between the copolymer and the alkyd being in the range of 1:10 to 10:1. Clear or pigmented coating compositions formed from such a blend and provided with an acidic catalyst can be applied as an appliance enamel and baked at 120° to 175° C. for a period of 5 to 15 minutes at the higher temperature to as much as an hour at the lower temperatures. Again, the copolymers may be applied as aqueous dispersions obtained by emulsion copolymerization.

Aqueous dispersions of water-insoluble copolymers of the present invention are especially useful. The copolymer dispersions thereby obtained may be employed directly with or without dilution with water for the coating of such materials as paper, leather, textiles, ceramics, and metals which may be either bare or primed with known commercial primers. They may also be employed for the coating of stone, cement, concrete, bricks, asbestos cement shingles, cinder block, and other masonry surfaces which are ordinarily subjected to moist conditions during use for the purpose of providing water-resistant coatings thereon. Such coatings serve to prevent the leaching of calcium, magnesium, and other salts normally present in the cementitious types of products which ordinarily cause effloresence, that is, the formation of a white disfiguration or discoloration at the surface of the products on wetting.

In general, the aqueous dispersions or organic solvent solutions of the copolymers may be employed as a clear composition to provide a thin, clear, glossy, transparent coating of highly decorative nature. If desired, however, dyes, fillers, or pigments can be included, the amount varying in dependence upon the particular purpose for which the composition is intended, to prepare water-base paints or like compositions. Examples of water-insoluble pigments which may be used include azo pigments and lakes, phthalocyanine pigments, vat dyestuffs in their water-insoluble form, and inorganic pigments such as carbon black, iron oxides, chrome yellows, titanium dioxides, and lithopone. Powdered or flaked metals may also be included, such as aluminum, bronze, brass, chromium, or gold. Mixtures may be used, if desired. The proportion of pigment used may vary from about 5 to 100% by weight, based on the weight of the copolymer.

When the copolymers in the form of aqueous latices, dispersions, or so-called "emulsions" are intended for coating or impregnating paper, textiles, leather, or other flexible materials, they should have an apparent second order transition temperature, $T_i$, which is not over 20° C., such as from about —40° C. to 22° C.; though, for other purposes, copolymers having a $T_i$ up to 150° C. may be used.

The $T_i$ value referred to herein is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

The aqueous or nonaqueous dispersions, or solutions in organic solvents, of the water-insoluble copolymers of the present invention may be used for the stabilization of wool fabrics against shrinkage on washing, as water-repellent finishes for fabrics, as binders for the fibers in non-woven fabrics, and as backcoatings for various types of fabrics, such as pile fabrics, especially those intended to be used for rugs, giving body to the fabrics and preventing ravelling.

The polymers of the present invention provide good adhesion to cellulosic fibers and synthetic fibers of nylon and acrylonitrile polymers. Non-woven webs bonded therewith exhibit excellent resistance to discoloration and stiffening on exposure to heat and ultraviolet light. The polymers are excellent for impregnating and unifying the fibrous backings used in making masking tapes, imparting thereto stability against solvents.

The polymers of the invention containing N-methylol or N-methoxymethyl groups, are useful for backing woven fabrics, and especially pile fabrics, used in upholstery. The crosslinking obtained on thorough curing can, in this setting, significantly increase the tensile strength of the film and backed structure as a whole, and it can substantially improve the seam strength thereof, depending on the particular construction of fabric and the amount of polymer applied. The polymers of the present invention are especially useful in the production of backed fabrics in that they can be applied before dyeing. Because of their capability of being cured to a highly cross-linked condition, the backed fabrics can be readily dyed thereafter without disturbing the backing.

The compositions are particularly useful in the preparation of pigment-printing and pigment-dyeing compositions for application to textile fabrics.

In all of the uses to which the polymer coatings formed of the polymers of the invention containing N-methylol or N-methoxymethyl groups are put, they can be insolubilized and thereby rendered quite durable, either by drying with or without ageing at room temperature, by prolonged subjection to the normal atmosphere in high temperature climates, or by heating the articles coated or impregnated with the polymer coatings described herein to a temperature of 1200° F. to 750° F. or higher for periods of time from a few seconds at the higher limit of the temperature range mentioned up to an hour or more at the lower portion thereof. Temperatures of 290° to 310° F. for 10 to 20 minutes are quite satisfactory. An acidic catalyst to accelerate this insolubilization may be included as described hereinafter. The insolubilization or thermosetting quality of these polymers may be modified, if desired, and insolubilization of any of the polymers of a compound of Formula IV may be effected by coreaction with a polyfunctional reagent, such as a polyisocyanate, a polyepoxide, or a thermosetting aminoplast condensate. Thus, for example, the aqueous coating compositions formed of these copolymer dispersions may be modified by the addition of a small proportion of certain water-soluble or self-dispersible urea-formaldehyde, N,N-ethyleneurea-formaldehyde, and aminotriazine-formaldehyde condensates as well as an acidic catalyst. Thus, penta-methylol or hexa-methylol melamine or a methylated penta-methylol or hexa-methylol melamine condensate obtained by etherification with methyl alcohol may be used. The proportion of condensate used is from one-twentieth to one-third of the weight of copolymer. Preferably, the condensate is employed at about 10 to 20% by weight of the copolymer. Note, for example, U.S. Pat. Nos. 3,235,622 to Clemens et al., 3,261,788 to Carter et al., and 3,365,514 to Fisk et al.

The modified coating compositions may simply be obtained by the dissolution of the polyfunctional reagent, such as the formaldehyde condensate, within the aqueous dispersion of the emulsion copolymer prepared as indicated above. In addition, an acidic catalyst is preferably also dissolved in the aqueous dispersion of the copolymer and condensate.

As stated, the aqueous coating composition may contain a small proportion, ranging from about 0.1% to 2% by weight of the aqueous composition, of an acidic catalyst to accelerate the condensation of the coating to insoluble and infusible condition. By "insoluble," at this point, is meant insolubility not only in water but in organic solvents in general. Examples of the acid catalyst are oxalic acid, ammonium phosphate, ammonium thiocyanate, boron trifluoride ethyl etherate, hydrochloric or other acid salts of a hydroxyaliphatic amine, including 2-methyl-2-amino-propanol, 2-methyl-2-amino - 1,3-propandiol, tris(hydroxymethyl)-aminomethane, 2-phenyl-2-amino-1-propanol, 2-methyl-2-amino-1-pentanol, 2-aminobutanol, triethanolamine, and 2-amino-2-ethyl-1-butanol, also ammonium chloride, pyridine hydrochloride, and benzyldimethylamine oxalate. The amine salts are water-soluble latent catalysts substantially neutral at ordinary temperature but dissociate into volatile components, one of which is acidic at the elevated temperatures used for baking and curing, so that the catalyst, after exerting its accelerating effect, is automatically discharged during the heating or curing stage.

In addition to the other ingredients, aqueous dispersions of the polymers of the present invention may contain a water-soluble thickening agent, such as gum tragacanth, water-soluble cellulose ethers, polyvinyl alcohol or partially saponified polyvinyl acetate, or copolymers of 30 to 60% of acrylic or methacrylic acid with 70 to 40% of ethyl or methyl acrylate. The aqueous dispersions may contain a mild alkali, for example, sodium acetate, sodium carbonate, chalk, morpholine, N-methyl-morpholine, triethylamine, or ammonia, including, if desired, a mixture of water-soluble substances which form a conventional, mildly alkaline buffer. The proportions of the several ingredients in the aqueous dispersions can be varied widely, and they are adjusted in any convenient manner so that the dispersions or pastes have a consistency suitable for application by the particular technique to be employed for this purpose.

After application of the thermosetting coating or impregnating compositions of the present invention to whatever substrate is involved, the coated or impregnated material is dried, either by simple exposure to the ambient atmosphere or by being subjected to elevated temperatures such as up to 140° to 180° F. Thereafter, the coated material may be subjected to a baking or curing operation involving the subjection thereof to a temperature from about 180° F. up to 750° F. for a time which is inversely proportional to the temperature. For example, at the lower range of temperature, the time may be from three-fourths of an hour to somewhat over an hour, such as 1¼ hours, in duration; whereas, at the upper portion of the temperature range, the time may be on the order of ten seconds to five minutes in duration. In an intermediate preferred range of about 290° to 310° F., a time period of about 10 minutes to 20 minutes may be employed. The heating operation serves to render the coating composition insoluble in organic liquids, as well as water, and also infusible. The upper limit of temperature and its duration should be so selected and correlated as to avoid decomposition or other damage to the coated or impregnated article. In some cases, insolubilization can be obtained by ageing at room temperature without need for a heating step.

The compositions may be applied to the substrates in any suitable manner such as by spraying, brushing, rollercoating dipping, knife-coating, and so on. Excess of the applied material may be wiped by any suitable squeegeeing operation such as between pressure rollers, by air squeegeeing, or by a knife or doctor blade. Thereafter, the coating may be dried and cured as stated hereinabove. Besides simple air-drying, there may be employed for this purpose heated air as in an oven or tunnel drier, radiation such as by infrared lamps, or electrical induction, either of electromagnetic or electrostatic high frequency induction fields. The baking or curing operation may be accomplished by the use of any suitable heating devices such as infrared lamps or electromagnetic or electrostatic high frequency induction devices.

When the coating compositions are applied to substrates having reactive groups, such as paper or textiles formed of cellulosic or proteinaceous fibers, it is believed that the substrate may take part in the reaction during curing and baking so that the copolymer (and the formaldehyde condensate, or polyisocyanate, or polyepoxide, if present) and the substrate are combined chemically, whereby outstanding adhesion, durability, and resistance to water, washing, laundering, and solvent, including those used for dry-cleaning, such as perchloroethylene, carbon tetrachloride, and solvent naphthas, are obtained.

The present invention provides novel thermoplastic, thermosettable, and/or thermosetting copolymers which combine the qualities of efficiency and economy. The component of Formula IV even in a small total amount of 0.5 to 4.5% by weight of the copolymer provides a higher efficiency of cure, in terms of temperature and time for a given catalyst system, than can be obtained from analogous previously known copolymers of thermosetting type, sometimes even when the latter copolymer is used with an auxiliary polyfunctional reagent, such as formaldehyde or a condensate of formaldehyde, such as that with melamine. For example, in the bonding of a non-woven fabric, the application of an acrylamide- or a methacrylamide-containing copolymer (containing no methylol groups) in conjunction with free formaldehyde, other conditions being the same, does not produce products having the laundering-resistance and dry-cleaning resistance obtained with the N-methylol containing copolymers of the present invention. The extent of cure can conveniently be determined by testing a non-woven fabric bonded with the copolymers for durability to home-laundering, commercial laundering, and dry-cleaning. The aqueous dispersions of the present invention are quite stable, being substantially unchanged on storage at 100° F. over periods of 3 to 8 months.

To assist those skilled in the art to practice the present invention, the following modes of operation are suggested by way of illustration, parts and percentages being by weight and the temperatures in ° C. unless otherwise specifically noted.

(1) Preparation of 4-pentenoguanamine.—A mixture of 34.5 parts of dicyandiamide, 100 parts of 4-pentene- nitrile (4-cyano-1-butene), 11.5 parts of methanol and 7.7 parts of 50% choline base ([2-hydroxyethyl]trimethyl-ammonium hydroxide) in methanol is stirred and heated to the reflux temperature (92°). Reflux is continued for twenty-four hours, during which time the temperature falls to 88°. The mixture is cooled and the solid product collected on a filter and washed with cold acetone to give 67.8 parts (99% yield) of 4-pentenoguanamine. Recrystallization from water provides white crystals, melting point 192–195°.

Analysis.—Cald. for $C_7H_{11}N_5$ (percent): C, 50.89; H, 6.74; N, 42.40. Found (percent): C, 50.72; H, 6.76; N, 42.64.

Distillation of the filtrate from the reaction mixture provides an 80% recovery of the theoretical amount of unreacted 4-pentenenitrile.

(2) N,N'-dimethylol-4-pentenoguanamine.—The pH of a mixture of 8.25 parts of 4-pentenoguanamine and 9.27 parts of 37% aqueous formaldehyde is adjusted to 9.4 with a 20% aqueous sodium hydroxide solution. The mixture is heated to 70–80° and the temperature is maintained for 15 minutes and then cooled. Concentration of the solution on a rotary evaporator results in an oil, which when poured into methanol, provides an 84% yield of white crystals. Recrystallization from methanol gives dimethylol-4-pentenoguanamine, melting point 70°.

(3) Methylolated 4-pentenoguanamine.—A mixture of 97 parts of 37% aqueous formaldehyde, 8 parts of 4-pentenoguanamine and 2 parts of potassium carbonate is heated for 29.5 hours at 95° and then allowed to cool. An insoluble oily product forms and separates. The oil is a mixture of all possible methylolated products with the tetra- and trisubstituted materials predominating.

(4) N,N' - dimethoxymethyl-4-pentenoguanamine.—A solution containing 16.5 parts of 4-pentenoguanamine, 7.27 parts of 91% paraformaldehyde, 76.8 parts of methanol and 1 part of 90% formic acid is heated at the reflux temperature (70°) for fourteen hours. The mixture is then concentrated to one-half its volume and cooled in ice. Dimethoxymethyl-4-pentenoguanamine crystallizes in 49.5% yield, melting point 121–123°.

Analysis.—Calcd. for $C_{11}H_{19}N_5O_2$ (percent): C, 52.16; H, 7.56; N, 27.65. Found (percent): C, 52.21; H, 7.56; N, 27.80.

(5) N,N'-dimethoxymethyl-4-pentenoguanamine.—To a solution of 1.5 parts of dimethylol-4-pentenoguanamine in 10 parts of methanol is added 0.15 part of 90% formic acid. The mixture is heated at the reflux temperature and then stripped to give dimethoxymethyl-4-pentenoguanamine.

(6) N,N' - dibutoxymethyl - 4-pentenoguanamine.—A mixture of 10 parts n-butanol, 1 part dimethylol-4-pentenoguanamine and 0.1 part 90% formic acid is heated at the reflux temperature for one hour and then cooled and stripped to give an oil which crystallizes on standing. Recrystallization from 95% ethanol provides a 90% yield of white crystals of N,N'-dibutoxymethyl-4-pentenoguanamine, melting point 78–80°.

Analysis.—Calc. for $C_{17}H_{31}N_5O_2$ (percent): C, 60.50; H, 9.26; N, 20.76. Found (percent): C, 60.53; H, 9.22; N, 20.57.

(7) Condensation of 4-pentenoguanamine, formaldehyde and methanol.—A mixture of 50 parts of 4-pentenoguanamine, 79.9 parts of 91% paraformaldehyde, 232.7 parts of methanol and 3 parts of 90% formica acid is heated to the reflux temperature for twenty-two hours and then stripped under vacuum to a temperature of 70° at 25 mm. The product, 102 parts, is a liquid composed predominately of tetramethoxymethyl-4-pentenoguanamine and trimethoxymethyl-4-pentenoguanamine and containing small amounts of di- and mono-alkylated products. Pure tetramethoxymethyl-4-pentenoguanamine, a liquid boiling point 170–178°/0.18 mm., and pure trimethoxymethyl-4-pentenoguanamine, melting point 65–66°, can be isolated by high-vacuum distillation.

(8) Condensation of 4-pentenoguanamine, formaldehyde and n-butanol.—The procedure of (7) can be followed using 270 parts of n-butanol in place of methanol. The product, 124 parts, is a liquid comprised predominately of tetra- and tri-butoxymethyl-4-pentenoguanamines.

(9) Homopolymerization of 4-pentenoguanamine.—A mixture of 25 parts of 4-pentenoguanamine, 50 parts of methyl Cellosolve (2-methoxyethanol) and 1.54 parts of di-tert-butyl peroxide is heated to 125° and held at this temperature for a twenty-four hour period. The solution is then cooled and the methyl Cellosolve is removed by evaporation. A white solid is precipitated from the thick paste obtained by addition of water. Washing with hot water causes the polymer to become oily; cooling causes solidification. The white solid product melts above 250° and has an elemental analysis consistent with that expected for the homopolymer.

(10) Emulsion polymerization of ethyl acrylate and methylolated-4-pentenoguanamine.—A monomer emulsion consisting of 160.0 parts of ethyl acrylate, 6.6 parts of 4-pentenoguanamine, 10.0 parts of a 37% solution of formaldehyde, 11.9 parts of Triton X–405 (tert-octylphenoxypoly(40)ethoxyethanol), 0.6 parts of a 27% solution of sodium lauryl sulfate and 393.6 parts deionized water is charged to a glass reaction flask provided with a nitrogen atmosphere. The emulsion is stirred, cooled to 15° C. and charged with 0.20 part of sodium hydrosulfite, 5.0 ml. of a 0.175% solution of ferrous sulfate heptahydrate and 15.0 ml. of a 1.28% solution of potassium persulfate. When the reaction has attained its maximum peak temperature (60–62°), a second monomer emulsion charge consisting of 320.0 parts of ethyl acrylate, 13.4 parts of 4-pentenoguanamine, 20.0 parts of a 37% solution of formaldehyde, 23.8 parts of Triton X–405, 1.3 parts of a 27% solution of sodium lauryl sulfate, 0.30 part of sodium hydrosulfite and 142.0 parts of deionized water is added simultaneously with 47.5 ml. of a 1.28% solution of potassium persulfate so as to maintain a temperature of 61–63° C. After the additions have been completed, stirring is continued until a 1° decrease in reaction temperature is observed. At this point 0.25 ml. increments of 70% tert-butyl hydroperoxide and 1.5 ml. increments of 2.0% sodium hydrosulfite are added until temperature increase with "chaser" initiator addition ceases. Stirring is continued until a marked decrease in temperature is observed, at which point an ice bath is applied to bring the temperature of the reaction mixture to 25° C. The final latex has a pH of 5.4, a solids content of 44.3% and a Brookfield viscosity of 20 centipoises at room temperature. Functional monomer incorporation is 75–76%.

(11) An emulsion polymer prepared as in (10) is adjusted to pH 3 and a solids content of 15%. Ammonium chloride catalyst (0.5%) is added and the latex is padded onto carded viscose webs weighing 0.4–0.5 oz./yd.². The impregnated non-woven webs are dried at room temperature. Curing at 220° F. for two minutes provides a bonded web which survives twenty-two washings.

(12) A solution comprising 57.0 parts of methyl methacrylate, 75.0 parts of butyl acrylate, 3.0 parts of methacrylic acid and 0.45 part of dicumyl peroxide is added in the course of two hours to a reaction flask containing 15.0 parts of 4-pentenoguanamine and 150.0 parts of 2-ethoxyethyl acetate maintained at reflux by means of external heating. Stirring and heating are continued for a total of twelve hours with periodic additions of 0.15 parts of dicumyl peroxide at the fourth, fifth, and sixth hours. The Gardner-Holdt viscosity of the resin solution is Q+ at approximately 50% resin solids.

(13) To 150.0 parts of the resin obtained in (12) above are added 46.9 parts of a 40% solution of n-butyl-hemiformal in n-butanol and 2.68 parts of a 35% solution of p-toluene-sulfonic acid in isopropanol (representing 1% catalyst on total solids). This composition is spread on cold-rolled steel to a 1.5 mil dried film thickness and baked at 300° F. for thirty minutes. For comparison, another portion of the resin solution without added p-toluenesulfonic acid catalyst is also baked onto cold-rolled steel at 300° F. for thirty minutes.

The clear coating, cured in the presence of catalyst passes a bend over a mandrel of ⅛ inch diameter, has an HB pencil hardness, shows excellent adhesion and softens to a 6B pencil hardness after thirty minutes exposure to 2-ethoxyethyl acetate. In contrast, the sample baked without catalyst dissolves in 2-ethoxyethyl acetate.

(14) To 150.0 parts of the resin solution obtained in (12) above is added 37.50 parts of a 50% solution of a butylated-melamine-formaldehyde condensate. This composition is spread on cold-rolled steel to a 1.5 mil dried film thickness and baked at 300° F. for thirty minutes.

The cured clear coating passes a bend over a mandrel of ⅛ inch in diameter, has an HB pencil hardness, shows excellent adhesion and softens to a 6B pencil hardness after thirty minutes exposure to 2-ethoxyethyl acetate.

(15) A solution comprising 95.0 parts of methyl methacrylate, 125.0 parts of butyl acrylate, 5.0 parts of methacrylic acid and 3.75 parts of benzoyl peroxide is added in the course of two hours to a reaction flask containing 25.0 parts of 4-pentenoguanamine and 166.7 parts of n-butanol maintained at reflux by means of external heating. Stirring and heating are continued for a total of eight hours with periodic additions of 0.25 parts of benzoyl peroxide at the third, fourth and fifth hours. The Gardner-Holdt viscosity of the resin solution is Z–3+ at approximately 60% resin solids.

(16) 300.0 parts of the resin solution obtained in (15) is admixed with 20.65 parts of paraformaldehyde, 1.26 parts of maleic anhydride and 100.0 parts of xylene. The resulting mixture is then refluxed under azeotropic conditions for three hours to remove water of reaction. The resinous product thus formed has a Gardner-Holdt viscosity of T+ at approximately 55% resin solids. This composition is spread on cold-rolled steel to a 1.5-mil dried film thickness and baked at 300° F. for thirty minutes.

The cured clear coating passes a bend over a mandrel of ⅛ inch in diameter, has a B pencil hardness, exhibits excellent adhesion, has 15 inch-lbs. of reverse impact resistance (as measured by a Gardner Laboratory Impact Tester) and softens to a 6B pencil hardness after thirty minutes exposure to 2-ethoxyethyl acetate.

(17) A solution comprising 96.0 parts of methyl methacrylate, 80.0 parts of butyl acrylate, 20.0 parts of permethoxymethyl-4-pentenoguanamine, 4.0 parts of methacrylic acid and 3.0 parts of benzoyl peroxide is added in the course of two hours to an inverted reaction flask containing 30.0 parts of 2-ethoxyethyl acetate and 170.0 parts of xylene maintained at 112° C. by means of external heating. Stirring and heating are continued for a total of eight hours with periodic additions of 0.2 parts of benzoyl peroxide at the third, fourth and fifth hours. The Gardner-Holdt viscosity of the resin solution is 0 at approximately 50% resin solids.

(18) To 400.0 parts of the resin solution of (17) is added 5.7 parts of a 35% solution of p-toluenesulfonic acid in isopropanol (representing 1% catalyst based on resin solids). This composition is spread on cold-rolled steel to a 1.5-mil dired film thickness and baked at 300° F. for thirty minutes.

The cured clear coating passes a bend over a mandrel of ⅛ inch in diameter, has an F pencil hardness, shows excellent adhesion and softens to a 6B pencil hardness after thirty minutes exposure to 2-ethoxyethyl acetate.

(19) Preparation of 10-undecenoguanamine.—A mixture of 43 parts of 10-undecenonitrile, 22 parts of dicyandiamide, 6 parts of 50% choline base in methanol and 100 parts of methyl Cellosolve is heated to the reflux temperature (125°) for twenty-two hours. During this time the dicyandiamide dissolves to give a clear solution. A solid slowly precipitates from the hot solution during the reaction. The mixture is cooled and filtered to give 3 parts of solid. Evaporation of the filtrate provides 16 parts of solid product. Recrystallization of the solid from methanol-water gives 13 parts of white, crystalline 10-undecenoguanamine, melting point 127–129°.

*Analysis.*—Calcd. for $C_{13}H_{23}N_5$ (percent): C, 62.61; H, 9.30; N, 28.09. Found (percent): C, 62.45; H, 9.19; N, 28.02.

(20) Emulsion polymerization of ethyl acrylate/10-undecenoguanamine.—A monomer emulsion consisting of 41.5 grams of ethyl acrylate, 2.6 grams of 10-undecenoguanamine, 5.3 grams of a 37% solution of formaldehyde, 3.1 grams of Triton X–405, 0.2 gram of a 27% solution of sodium lauryl sulfate, 0.1 gram of sodium acetate and 113.2 grams of deionized water is charged to a glass reaction flask provided with a nitrogen atmosphere. The emulsion is stirred, cooled to 15° C. and charged with 3.0 grams of a 3.33% solution of isoascorbic acid, 1.5 ml. of a 0.175% solution of ferrous sulfate heptahydrate and 0.12 gram of 70% t-butylhydroperoxide. When the reaction has attained its maximum peak temperature (52–54° C.), a second monomer emulsion charge consisting of 99.5 grams of ethyl acrylate, 6.4 grams of 10-undecenoguanamine, 12.7 grams of a 37% solution of formaldehyde, 716 grams of Triton X–405, 0.4 gram of a 27% solution of sodium lauryl sulfate, 0.2 gram of sodium acetate, 0.2 gram of isoascorbic acid and 53.4 grams of deionized water is added simultaneously with 0.25 gram of 70% t-butylhydroperoxide. The addition rates are controlled so as to maintain a temperature of 52–54° C. After the additions have been completed stirring is continued and a 1° decrease in temperature is noted. At this point 10 drops of 70% t-butylhydroperoxide is added. After a marked decrease in temperature is observed, an ice bath is applied to bring the temperature of the reaction mixture to 25° C. The final latex has a pH of 5.4, a solids content of 43.7% and a Brookfield viscosity of 23 centipoises at room temperature. There is obtained an emulsion copolymer of about 95.6% ethyl acrylate and 4.4% of 10-undecenoguanamine.

This emulsion copolymer dispersion, when applied as a binder for non-woven fabrics by the procedure of (11) above gives a fabric which survives 20 washes.

(21) A mixture of 36.9 parts of 7-octene nitrile, 8.4 parts dicyandiamide, 2 parts of 50% choline base in methanol and 3 parts of methanol is heated to the reflux temperature and held there for twenty-four hours. The mixture is then cooled and filtered to give 12 parts of white solid product, 7-octenoguanamine.

(22) A mixture of 137 parts of 2,2-diethyl-4-pentenonitrile, 28 parts of dicyandiamide, 6.2 parts of 50% choline in methanol and 9.3 parts of methanol is heated at the reflux temperature for 36 hours and then cooled. Filtration provides 42 parts of 2,2-diethyl-4-pentenoguanamine.

(23) A monomer emulsion consisting of 157.8 parts of ethyl acrylate, 8.8 parts of 2,2-diethyl - 4-pentenoguanamine, 11.9 parts of Triton X–405, 0.6 part of a 27% solution of sodium lauryl sulfate, 10.0 parts of a 37% solution of formaldehyde and 393.6 parts of deionized water is charged to a glass reaction flask provided with a nitrogen atmosphere. The emulsion is stirred, cooled to 15° C., and charged with 0.20 part of sodium hydrosulfite, 5.0 ml. of a 0.175% solution of ferrous sulfate heptahydrate and 15.0 ml. of a 1.28% solution of potassium persulfate. When the reaction has attained its maximum peak temperature, a second monomer emulsion consisting of 315.7 parts of ethyl acrylate, 17.7 parts of 2,2-diethyl-4-pentenoguanamine, 23.8 parts of Triton X–405, 1.3 parts of a 27% solution of sodium lauryl sulfate, 20.0 parts of a 37% solution of formaldehyde, 142.0 parts of deionized water and 0.30 part of sodium hydrosulfite is added simultaneously with 47.5 ml. of a 1.28% solution of potassium persulfate. The addition rates are controlled so as to maintain a reaction temperature of minus 1° to plus 1° of the original peak temperature. After the additions have been completed, stirring is continued until a 1° decrease in temperature is noted. At this point 0.5 ml. of 70% t-butylhydroperoxide and 3.0 ml. of a 2.0% solution of sodium hydrosulfite are added. The final latex containing a copolymer of about 97.5 mol percent ethyl acrylate and 2.5 mol percent of 2,2-diethyl - 4-pentoguanamine is then cooled to room temperature.

(24) A monomer emulsion consisting of 158.2 parts of ethyl acrylate, 8.5 parts of 7-octenoguanamine, 11.9 parts of Triton X–405, 0.6 part of a 27% solution of sodium lauryl sulfate, 10.0 parts of a 37% solution of formaldehyde and 393.6 parts of deionized water is charged to a glass reaction flask provided with a nitrois charged to a glass reaction flask provided with a nitrogen atmosphere. The emulsion is stirred, cooled to 15° C., and charged with 0.20 part of sodium hydrosulfite, 5.0 ml. of a 0.175% solution of ferrous sulfate heptahydrate and 15.0 ml. of a 1.28% solution of potassium persulfate. When the reaction has attained its maximum peak temperature, a second monomer emulsion consisting of 316.3 parts of ethyl acrylate, 17.0 parts of 7-octenoguanamine, 23.8 parts of Triton X–405, 1.3 parts of a 27% solution of sodium lauryl sulfate, 20.0 parts of a 37% solution of formaldehyde, 142.0 parts of deionized water and 0.30 part of sodium hydrosulfite is added simultaneously with 47.5 ml. of a 1.28% solution of potassium persulfate. The addition rates are controlled so as to maintain a reaction temperature of minus 1° to plus 1° of the original peak temperature. After the additions have been completed, stirring is continued until a 1° C. decrease in temperature is noted. At this point 0.5 ml. of 70% t-butylhydroperoxide and 3.0 ml. of a 2.0% solution of sodium hydrosulfite are added. The final latex containing a copolymer of about 97.5 mol percent of ethyl acrylate and about 2.5 mol percent of 7-octenoguanamine is then cooled to room temperature.

(25) Foamed polymer.—A latex prepared by conventional emulsion polymerization from 95 parts ethyl acrylate or other "soft" monomer such as other esters of acrylic acid, 4 parts of 4-pentenoguanamine and 1 part of acrylic acid containing about 45% solids is formulated as follows:

| Component: | Parts |
|---|---|
| Latex | 100 |
| RA–45 ($TiO_2$) | 6 |
| Desertalc 144 (talc) | 24 |
| Alfol 14/Cellosolve | 3.7 |
| Sodium lauryl sulfate 27%/Triton X–405 | 7.5 |
| Ammonia to pH of 9. | |

The formulation is whipped in a Kitchen Aid mixer, cast at 50 mils onto drapery fabric, dried for 2 minutes at 300° F., crushed between pad rolls and cured for 5 minutes at 300° F.

The crushed foam formulation gives a drier surface than other polymers of the same softness, e.g., Rhoplex HA–8, and a much lower cold-flex temperature than polymers of the same surface dryness; e.g., Rhoplex E–32.

(26) Wool stabilization.—A woolen/worsted fabric known for its difficulty to stabilize is used either as is or pretreated with an oxidizing bath. After a dip and nip through a padder the fabric is dried and cured for 15 minutes at 200° F., a temperature chosen to eliminate wool discoloration. The wool stabilized with the latex of (25) has a drier, fuller hand, i.e., more wool like, than obtained with Rhoplex K–3. Shrinkage values after washing in a Cascade washer at 140° F. are tabulated below.

TABLE I.—STABILIZATION OF PRETREATED WOOL BY POLYMERIC BINDERS

| Polymer: | Pretreatment | Resin solids, percent | Shrinkage, percent 1 hr. W | 1 hr. F | 2 hrs. W | 2 hrs. F |
|---|---|---|---|---|---|---|
| None | None | 0 | 46 / 46 | 25 / 23 | 51 | 26 |
| Do | KBrO₃ | 0 | 28 / 26 | 14 / 12 | 40 | 18 |
| K-3 | None | 4.2 | 45 / 41 | 16 / 17 | 48 | 19 |
| K-3 | KBrO₃ | 5.0 | 20 / 20 | 8 / 8 | 31 | 11 |
| Latex of 25 | None | 4.5 | 32 / 33 | 6 / 12 | 43 | 8 |
| Do | KBrO₃ | 4.6 | 2 / 3 | 2 / 1 | 3 | 2 |

(27) Pigment finishing of Fiberglas.—Beta glass fabric is padded through a bath of the following formulation:

| Product: | Parts |
|---|---|
| Latex of (25) | 10 |
| Kemprint G | 5 |
| Photex A-9 | 3.5 |
| Coupling agent Z-6040 | 0.5 |
| Ammonia to pH 9.4. | |
| Aridye Padding Blue 2G | 3 |
| Water | 78 |
| | 100.0 |

The fabric is cured 1½ minutes at 375° F. and then washed ten times in a Maytag washer at 105° F. The pigment retention is obtained from reflectance measurements. (25) gives the best wash durability (Table II) coupled with excellent softness, and slightly better crock resistance. The trademarked materials are pigments, dyes, and dyeing aids.

TABLE II.—DURABILITY OF FIBERGLAS PIGMENTED FINISHES

| | Ignition loss, percent | Percent pigment retention |
|---|---|---|
| Latex: | | |
| Prior art | 2.0 | 66.2 |
| Do | 1.8 | 83.5 |
| 25 | 2.1 | 91.6 |

(28) Bonding of polyester or polyolefin nonwovens.—Rayon, "Kodel" and polypropylene nonwoven webs are padded through baths containing 0.5% NH₄Cl or 0.1% oxalic acid and enough latex to give an equal weight of dry pick-up (13.5%). The nonwovens are air dried and cured for two minutes at the temperatures, in degrees F. given at the top of each column. The basic difference between the a and b latices is the first is made with ethyl acrylate and the second with butyl acrylate.

In the preceding description and the claims, the cyclic guanamines are provided with common names corresponding to the nitrile from which the guanamine is derived. Thus 4-pentenoguanamine is the simplest of those embraced in Formula I, namely that in which R is H₂C=CH—CH₂— since this compound is obtainable by the reaction of 4-pentenonitrile (or the nitrile of 4-pentenoic acid) with dicyandiamide. The numerical prefix refers to the position of the double bond in the radical R—CH₂—C< by counting the carbon of this radical which is in the guanamine ring as the first carbon of the radical referred to.

Alternate nomenclature which is generally accepted as the preferred correct terminology defines the compounds as 2,4-diamino-s-triazines substituted in the "6" position of the triazine ring with an alkenyl group R—CH₂— in which R is as hereinbefore defined. Thus the simplest compound hereinabove called 4-pentenoguanamine is also more correctly called 6-(3-butenyl)-2,4-diamino-s-triazine. In this case, the designation of the position of unsaturation in the alkenyl group is obtained by counting the carbon of the —CH₂— group in the R—CH₂— group as the first carbon of the alkenyl group. With this description of the alternate nomenclature that can be used in naming the monomeric compounds of the present invention, chemists can go from one system of nomenclature to the other at will.

As to additional applicable nomenclature, see also U.S. Pat. 2,447,175, column 1, lines 39 to 55.

We claim:
1. An article of manufacture having a coating on a surface thereof of a solid addition polymer containing a polymerized compound of the formula:

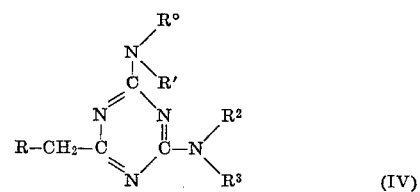

(IV)

wherein:
R is an alkenyl group having 3 to 9 carbon atoms and a terminal group of the formula H₂C=C<,
R° is H, CH₂OH, or CH₂OR″ wherein R″ is the hydrocarbon residue of a saturated alcohol R″OH having 1 to 8 carbon atoms,
R′ is H, CH₂OH, or CH₂OR″,
R² is H, CH₂OH, or CH₂OR″, and
R³ is H, CH₂OH, or CH₂OR″.

2. The article according to claim 1 characterized in that the polymer is a homopolymer of a compound of Formula IV as defined in claim 1.

3. The article of claim 1 in which the solid polymer is an addition copolymer of at least one compound of

TABLE III.—PHYSICAL PROPERTIES OF NONWOVEN WEBS

| | Washes survived | | | | | | | | | Tensile strength of webs, oz./in. Water-wet | | | | | | | | |
|---|---|---|---|---|---|---|---|---|---|---|---|---|---|---|---|---|---|---|
| | Rayon | | | Polyester | | | Polypropylene | | | Rayon | | | Polyester | | | Polypropylene | | |
| Latex | 180° | 220° | 260° | 180° | 220° | 260° | 180° | 220° | 260° | 180° | 220° | 260° | 180° | 220° | 260° | 180° | 220° | 260° |
| 25a | 1 | 3 | 16 | 20 | 20 | 20 | 20 | 20 | 20 | 6.7 | 9.2 | 14.6 | 22.0 | 27.6 | 33.0 | 8.6 | 11.2 | 6.8 |
| 25b | 1 | 4 | 20 | 20 | 20 | 20 | 17 | 20 | 17 | 6.1 | 8.3 | 14.6 | 18.8 | 21.7 | 36.2 | 6.6 | 5.6 | 7.0 |
| "Rhoplex HA-8" | 0 | 0 | 20 | 1 | 9 | 20 | 0 | 7 | 20 | 5.0 | 6.1 | 16.3 | 9.7 | 15.7 | 18.5 | 4.6 | 6.7 | 9.1 |

| | Tensile strength of webs, oz./in. | | | | | | | | | | | | | | | | | |
|---|---|---|---|---|---|---|---|---|---|---|---|---|---|---|---|---|---|---|
| | Isopropanol-wet | | | | | | | | | Perchloroethylene-wet | | | | | | | | |
| | Rayon | | | Polyester | | | Polypropylene | | | Rayon | | | Polyester | | | Polypropylene | | |
| Latex | 180° | 220° | 260° | 180° | 220° | 260° | 180° | 220° | 260° | 180° | 220° | 260° | 180° | 220° | 260° | 180° | 220° | 260° |
| 25a | 10.9 | 11.2 | 19.0 | 18.4 | 24.3 | 25.6 | 4.4 | 4.1 | 5.0 | 11.5 | 13.6 | 13.8 | 16.9 | 20.7 | 24.7 | 2.7 | 3.3 | 3.8 |
| 25b | 9.5 | 11.0 | 9.5 | 14.4 | 18.3 | 18.6 | 3.1 | 3.2 | 3.3 | 9.3 | 8.5 | 12.9 | 9.7 | 14.0 | 19.0 | 1.7 | 1.7 | 1.5 |
| "Rhoplex HA-8" | 3.0 | 3.0 | 10.1 | 2.5 | 4.8 | 7.9 | 1.3 | 2.0 | 2.3 | 3.7 | 6.5 | 13.2 | 3.4 | 3.9 | 5.7 | 1.3 | 1.6 | 1.9 |

NOTE.—Rhoplex is a registered trademark.

Formula IV as defined in claim 1 with at least one other copolymerizable ethylenically unsaturated compound.

4. The article of manufacture of claim 1 having a coating on a surface thereof of a solid addition copolymer of a mixture of polymerizable ethylenically unsaturated molecules comprising at least about 0.5% by weight, based on the total weight of said molecules, of a compound of Formula IV as defined in claim 1.

5. An article of manufacture having a coating on a surface thereof of a solid addition polymer containing polymerized 4-pentenoguanamine.

6. The article of claim 5 in which said solid addition copolymer is of 4-pentenoguanamine and at least one other copolymerizable ethylenically unsaturated compound.

7. The article of claim 6 in which said copolymer is of a mixture of monoethylenically unsaturated molecules comprising about 0.5 to 99.5% by weight, based on the total weight of said molecules, of 4-pentenoguanamine.

8. The article of claim 6 in which said copolymer is of about ¼ to 30% by weight of 4-pentenoguanamine and up to 99¾% by weight of at least one monomer selected from acrylic acid, methacrylic acid, the nitriles thereof, the esters thereof with a saturated aliphatic alcohol having 1 to 18 carbon atoms, acrylamide, metchacrylamide, the N-methylol derivatives of these amides, itaconic acid, vinyl acetate, vinyl chloride, styrene, and o-, m-, and p-vinyltoluene.

9. The article of claim 1 in which said polymer is a copolymer of a mixture of ethylenically unsaturated molecules comprising about 0.5 to 99.5% by weight, based on the total weight of said molecules, of 4-pentenoguanamine having an average of from about one to four methylol groups substituted for hydrogen on its amino nitrogens.

10. The article of claim 1 in which said polymer is a copolymer of about ¼ to 30% by weight of 4-pentenoguanamine having an average of from about one to four methylol groups substituted for hydrogen on its amino nitrogens and up to 99¾% by weight of at least one monomer selected from acrylic acid, methacrylic acid, the nitriles thereof, the esters thereof with a saturated aliphatic alcohol having 1 to 18 carbon atoms, acrylamide, methacrylamide, the N-methylol derivatives of these amides, itaconic acid, vinyl acetate, vinyl chloride, vinylidene chloride, styrene, and o-, m-, and p-vinyltoluene.

11. The article of claim 1 in which said polymer is a copolymer of a mixture of monoethylenically unsaturated molecules comprising about 0.5 to 99.5% by weight, based on the total weight of said molecules, of 4-pentenoguanamine having an average of about one to four methoxymethyl groups substituted for hydrogen on its amine nitrogen.

12. The article of claim 1 in which said polymer is a copolymer of about ¼ to 30% by weight of 4-pentenoguanamine having an average of from about one to four methoxymethyl groups substituted for hydrogen on its amino nitrogens and up to 99¾% by weight of at least one monomer selected from acrylic acid, methacrylic acid, the nitriles thereof, the esters thereof with a saturated aliphatic alcohol having 1 to 18 carbon atoms, acrylamide, methacrylamide, the N-methylol derivatives of these amides, itaconic acid, vinyl acetate, vinyl chloride, vinylidene chloride, styrene, and o-, m-, and p-vinyltoluene.

13. The article of claim 1 in which said polymer comprises a polymerized compound of the formula:

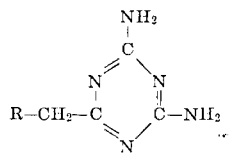

wherein R is an alkenyl group having 3 to 9 carbon atoms and a terminal $H_2C=C<$ group.

14. The article of claim 1 in which said polymer is a copolymer of a mixture of monoethylenically unsaturated molecules comprising at least about 0.5% by weight, based on the total weight of said molecules, of a compound of the formula:

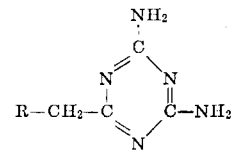

wherein R is an alkenyl group having 3 to 9 carbon atoms and a terminal $H_2C=C<$ group.

15. The article of claim 1 in which said polymer contains a polymerized compound of the formula:

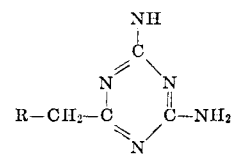

wherein R is an alkenyl group having 3 to 9 carbon atoms and a terminal $H_2C=C<$ group, said compound having an average of about one to four hydrogen atoms on the amine groups substituted by a group of the formula $—CH_2O(CH_2)_{n-1}—H$ wherein $n$ is an integer having a value of 1 to 2.

16. The article of claim 15 in which said polymer is a copolymer of a mixture of ethylenically unsaturated molecules comprising at least about 0.5% by weight, based on the total weight of said molecules, of said compound of the formula:

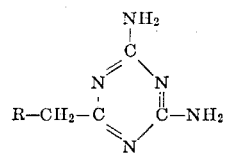

wherein R is an alkenyl group having 3 to 9 carbon atoms and a terminal group $H_2C=C<$, said compound having an average of about one to four hydrogen atoms of the amine groups substituted by a group of the formula $—CH_2O(CH_2)_{n-1}—H$ wherein $n$ is an integer having a value of 1 to 2.

17. An article of manufacture having a coating on a surface thereof comprising polymerized 10-undecenoguanamine.

18. A process of making the article 1 comprising the steps of applying the polymer to said surface in the form of a solution, and curing said polymer.

19. A process of making the article of claim 1 comprising the steps of applying the polymer to said surface in the form of a dispersion of polymer particles, and curing said polymer.

20. The process of claim 18 or claim 19 in which an aminoplast is also applied to said surface and is cured.

21. The process of modifying fibrous materials containing hydroxyl and/or amide groups comprising the steps of (1) contacting the material of which the fibers are formed with a compound of the formula:

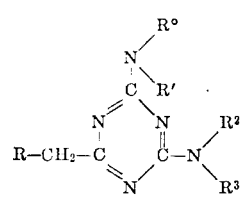

wherein:
R is an alkenyl group having 3 to 9 carbon atoms and a terminal group of the formula $H_2C=C<$, R° is H, CH$_2$OH, or CH$_2$OR″ wherein R″ is the hydrocarbon residue of a saturated alcohol R″OH having 1 to 8 carbon atoms, R′ is H, CH$_2$OH, or CH$_2$OR″, R$^2$ is H, CH$_2$OH, or CH$_2$OR″, and R$^3$ is H, CH$_2$OH, or CH$_2$OR″, (2) causing said compound to react with said hydroxyl and/or amide groups, and (3) causing polymerization of said compound by vinyl addition, steps (2) and (3) being in any order.

References Cited

UNITED STATES PATENTS 3,446,777   5/1969   Emmons _____ 260—78.5

GEORGE F. LESMES, Primary Examiner

B. BETTIS, Assistant Examiner

U.S. Cl. X.R.

8—115.5, 127.6; 117—135.5, 138.8